United States Patent
Park (10) Patent No.: US 11,280,308 B2
(45) Date of Patent: Mar. 22, 2022

(54) SYSTEM AND METHOD FOR CONTROLLING REMOTE STARTING OF VEHICLE

(71) Applicants: Hyundai Motor Company, Seoul (KR); Kia Motors Corporation, Seoul (KR)

(72) Inventor: Deok-Ho Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 141 days.

(21) Appl. No.: 16/859,310

(22) Filed: Apr. 27, 2020

(65) Prior Publication Data

US 2021/0180554 A1 Jun. 17, 2021

(30) Foreign Application Priority Data

Dec. 12, 2019 (KR) .................. 10-2019-0166047

(51) Int. Cl.
| | |
|---|---|
| *F02N 11/08* | (2006.01) |
| *B60Q 9/00* | (2006.01) |
| *B60T 17/22* | (2006.01) |
| *B60W 40/076* | (2012.01) |

(52) U.S. Cl.
CPC .......... *F02N 11/0807* (2013.01); *B60Q 9/00* (2013.01); *B60T 17/221* (2013.01); *B60W 40/076* (2013.01); *F02N 2200/08* (2013.01); *F02N 2200/0803* (2013.01)

(58) Field of Classification Search
CPC ........ F02N 11/0807; F02N 2200/08; F02N 2200/124; F02N 2200/0803; B60K 35/00; B60K 2370/152; B60Q 9/00; B60T 7/16; B60T 7/085; B60T 11/046; B60T 2220/04; B60T 17/221; B60W 10/06; B60W 10/182; B60W 40/076; B60W 50/14; B60W 2050/146; B60W 2552/15
USPC ....................................................... 123/179.2
See application file for complete search history.

(56) References Cited

U.S. PATENT DOCUMENTS

| | | | |
|---|---|---|---|
| 2009/0251284 A1* | 10/2009 | Wilson ................ | F02N 11/0807 340/5.64 |
| 2018/0111596 A1* | 4/2018 | Kim .......................... | B60T 7/16 |
| 2018/0347532 A1* | 12/2018 | Tam ..................... | G07C 5/0841 |
| 2019/0047357 A1* | 2/2019 | Skingsley .......... | B60H 1/00778 |

(Continued)

FOREIGN PATENT DOCUMENTS

KR 10-1131739 B1 4/2012

*Primary Examiner* — Phutthiwat Wongwian
*Assistant Examiner* — Arnold Castro
(74) *Attorney, Agent, or Firm* — Mintz Levin Cohn Ferris Glovsky and Popeo, P.C.; Peter F. Corless (57) ABSTRACT

A system and method for controlling the remote starting of a vehicle are provided to determine whether the remote starting is possible by comparing a parking lever operating force measured by a sensor with a reference parking lever operating force corrected in consideration of the durability degradation of a parking system. The method includes sensing a driving distance of the vehicle, operating times of a parking lever, a road inclination, and a parking lever operating force, when the vehicle is parked. Whether the remote starting is possible is determined by comparing a magnitude of the parking lever operating force with a magnitude of a reference parking lever operating force.

20 Claims, 5 Drawing Sheets

(56) References Cited

U.S. PATENT DOCUMENTS

2020/0361431 A1\* 11/2020 Park .................. B60T 7/122
2021/0107453 A1\* 4/2021 Shelton ............... B60W 10/182
2021/0172484 A1\* 6/2021 Kwon ................. F02N 11/0807

\* cited by examiner

SYSTEM AND METHOD FOR CONTROLLING REMOTE STARTING OF VEHICLE

CROSS-REFERENCE TO RELATED APPLICATION

This application claims under 35 U.S.C. § 119(a) the benefit of Korean Patent Application No. 10-2019-0166047 filed on Dec. 12, 2019, the entire contents of which are incorporated herein by reference.

BACKGROUND

(a) Technical Field

The present disclosure relates to a system and method for controlling the remote starting of a vehicle, and more particularly, to a system and method for controlling the remote starting of a vehicle, which determine whether the remote starting is possible by comparing a parking lever operating force measured by a sensor with a reference parking lever operating force corrected based on the durability degradation of a parking system.

(b) Background Art

Generally, remote starting refers to a user starting a vehicle through a communication server using an application of a mobile phone or a smart phone to enter a vehicle which is already warmed up or in a temperature comfortable state. The remote starting may be attempted even in a vehicle parked on a ramp. However, if the remote starting is performed on the ramp, torque generated by the output of an engine reduces a parking braking force even if a parking brake is activated, thus causing the vehicle to move along the ramp and potentially leading to a situation where people or objects on a moving path of the vehicle may be endangered.

Accordingly, the remote starting is usually applied to an automatic (AT) vehicle equipped with an automatic transmission. Since the AT vehicle performs a cooperative control with an electronic parking brake (EPB), the EPB is automatically activated if the AT vehicle is rolled back while the vehicle is parked on the ramp, thus maintaining a parking state. The related art teaches a method of preventing the roll-back, caused by the automatic release of an electronic brake in an AT vehicle using an electronic brake device, with an automatic transmission.

However, the remote starting is not applied to a vehicle equipped with a manual transmission (MT vehicle) for safety reasons since the braking force of the parking brake is unreliable when the vehicle is parked on the ramp, for example. In other words, in the MT vehicle, the braking force of the parking brake is generated by pulling the parking lever. Thus, if the parking lever is repetitively operated, a reduction in durability of the parking system such as the stretching of a parking cable may occur. If the remote starting is performed in this state, the parking braking force may be undesirably released.

SUMMARY

The present disclosure provides a control method for attaining the reliability of an parking lever operating force, thus allowing remote starting to be attempted even in a vehicle equipped with a manual transmission.

According to one aspect of the disclosure, the present disclosure provides a method for controlling remote starting of a vehicle that may include: sensing a driving distance of the vehicle, operating times of a parking lever, a road inclination, and a parking lever operating force, when the vehicle is parked; and determining whether the remote starting is possible by comparing a magnitude of the parking lever operating force with a magnitude of a reference parking lever operating force under conditions of the driving distance of the vehicle, the operating times of the parking lever, and the road inclination. In particular, the reference parking lever operating force may cause degradation correction to be performed, the degradation correction being correction for increasing the parking lever operating force that is reduced due to durability degradation of a parking system to a value preset for each road inclination.

According to the present disclosure, even when a parking lever operating force is reduced due to the repetitive operation of a parking lever in a vehicle, a correcting operation may be performed to compensate for the reduced parking lever operating force, and thus the reliability of the parking lever operating force may be increased and the remote starting may be possible.

Furthermore, according to the present disclosure, it may be possible to utilize a conventional sensor such as a parking lever stroke sensor and an inclination sensor when a remote starting apparatus is designed in a vehicle, thereby minimizing the number of components and a weight, and achieving a cost reduction.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a system and method for controlling the remote starting of a vehicle according to exemplary embodiments of the present disclosure will be described in detail with reference to the accompanying drawings. The terminologies or words used in the description and claims of the disclosure should not be interpreted as being limited merely to common or dictionary meanings. On the contrary, they should be interpreted based on the meanings and concepts of the disclosure in keeping with the scope of the disclosure based on the principle that the inventor(s) can appropriately define the concepts of terms to describe the disclosure in the best way.

Figure 1:
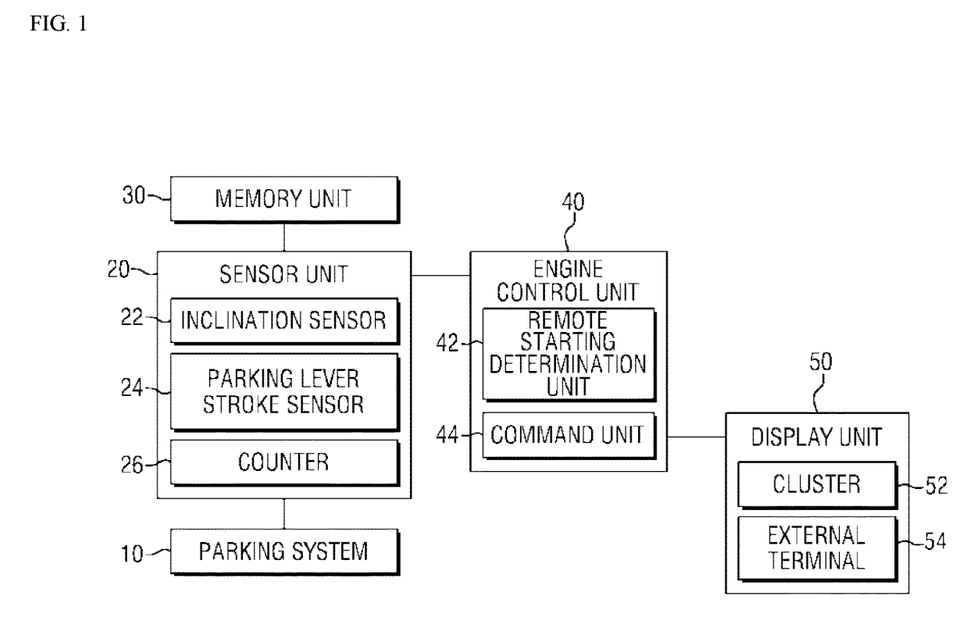
FIG. 1 is a diagram schematically showing the configuration of a control system according to an exemplary embodiment of the present disclosure.
Figure 2:
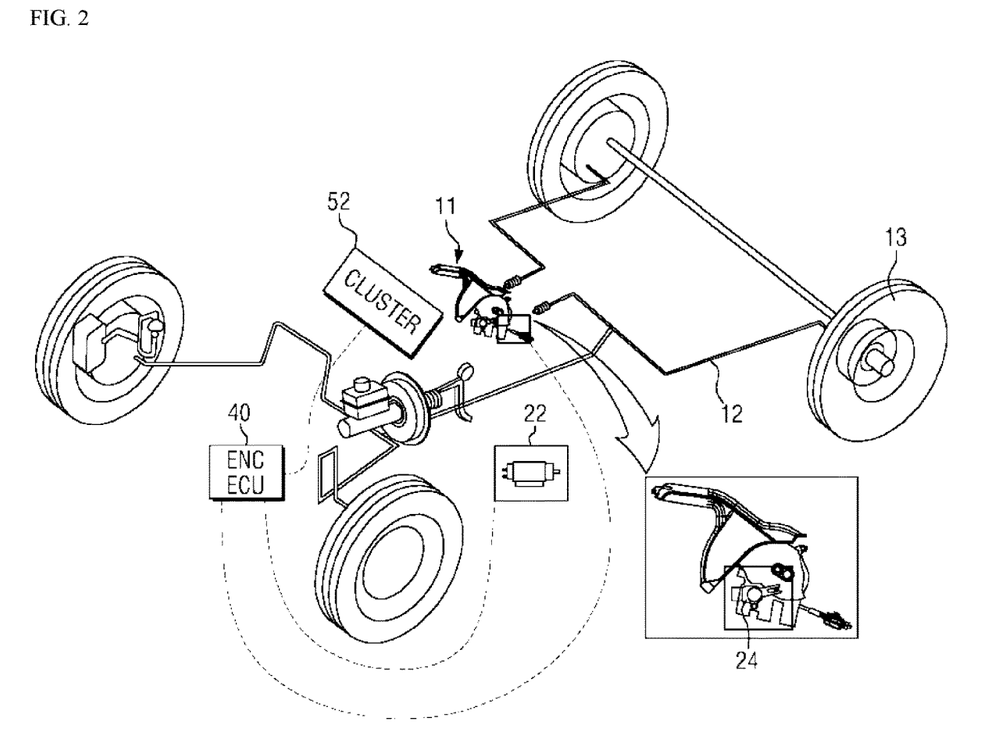
FIG. 2 is a diagram showing a state in which the control system of FIG. 1 is applied to a vehicle according to an exemplary embodiment of the present disclosure.

FIG. 1 is a diagram schematically showing the configuration of a control system according to an exemplary embodiment of the present disclosure, and FIG. 2 is a diagram showing a state in which the control system of FIG. 1 is applied to a vehicle.

Referring to FIGS. 1 and 2, the control system according to the exemplary embodiment of the present disclosure is a control system that corrects a reduced parking braking force due to the durability degradation of a parking system as a parking lever is repetitively manipulated in a vehicle equipped with a manual transmission, and then determines whether the remote starting is possible. The control system may include a parking system 10, a sensor unit 20, a memory 30, an engine controller 40, and a display 50.

The parking system 10 is an integrated configuration that allows a braking force for parking after the vehicle stops to be transmitted to a wheel, and may include a parking lever 11 and a parking brake 13. Although the parking lever 11 is mainly described herein, the same applies to a vehicle equipped with a parking pedal. When the parking lever 11 is lifted up or pulled after the vehicle stops, the parking lever 11 may be rotated, thus causing the parking cable 12 to be pulled and thereby a parking brake is operated. In this regard, as an angle at which the parking lever 11 is lifted up increases, tension applied to the parking cable 12 and the parking braking force increase. Particularly, the braking force acting on the parking lever 11 is referred to as a parking lever operating force.

Meanwhile, a process of maintaining a state in which the parking lever 11 is lifted up may include: when the parking lever 11 rotates in a direction in which it is lifted up and then stops, a pawl mounted on the parking lever 11 slides over latch gear teeth secured to a panel and then is fitted between neighboring latch gear teeth, thus fixing the parking lever 11. In particular, a state in which the parking lever 11 is completely lowered is referred to as a 0 notch. As the angle at which the parking lever 11 is lifted up increases, the notch increases. This notch is referred to as a parking lever notch. Since the parking lever notch is proportional to the parking lever operating force, the range of the parking lever operating force corresponding to each parking lever notch may be preset when the parking system is designed. For example, when the parking lever notch is 7 notches, the parking lever operating force may be set to be in a range from about 15 to 25 kgf.

In the exemplary embodiment of the present disclosure, the parking brake 13 may include a drum- or disk-type brake. However, the drum brake will be described in the exemplary embodiment of the present disclosure. The sensor unit 20 may include an inclination sensor 22 configured to sense the inclination of a road when the vehicle is parked, a parking lever stroke sensor 24 configured to sense the operating times of the parking lever and the parking lever operating force when the parking lever 11 is operated, and a counter 26 configured to detect the driving distance of the vehicle. Particularly, the parking lever operating force may be converted into a parking lever notch. In FIG. 1, the sensor unit 20 may be connected to only the parking system 10, but may also be connected to a drive unit (not shown) to sense the driving distance of the vehicle.

The memory 30 may be configured to receive and store current information sensed by the sensor unit 20, and store preset comparison information to allow the engine controller 40 which will be described later to compare the preset comparison information with the current information. The memory 30 may adopt any one of various memory devices configured to store predetermined information.

In the exemplary embodiment of the present disclosure, the comparison information includes information regarding the reference parking lever operating force based on the inclination of the road when the vehicle is parked. In addition, information compared with the reference parking lever operating force is the parking lever operating force sensed by the sensor unit 20. Hereinafter, the reference parking lever operating force will be described in detail.

The reference parking lever operating force is the parking lever operating force obtained for each inclination of the road to maintain a stop state when the vehicle is parked. For the vehicle to maintain a parking state, the magnitude of braking torque (hereinafter, referred to as 'first braking torque') generated in the drum brake by the operation of the parking lever 11 should be equal to or greater than that of braking torque (hereinafter, referred to as 'second braking torque') applied to the vehicle when the vehicle is parked.

The second braking torque may be referred to as braking torque required to park the vehicle.

The first braking torque may be expressed by the following Equation 1.

First braking torque=$(E \times R_1 - e) \times \varepsilon \times PBF \times R_e$  Equation 1 wherein, E denotes the parking lever operating force, $R_1$ denotes a parking lever ratio, e denotes an initial braking operating force, $\varepsilon$ denotes the efficiency of the parking brake, PEF denotes a parking brake factor which is differently set based on the forward or backward direction of the vehicle in the case of the drum brake, and $R_e$ denotes the effective radius of the brake. The first braking torque is considered as occurring only on a rear wheel.

In the exemplary embodiment of the present disclosure, each factor forming the first braking torque may be set to have a minimum magnitude for safety considerations. The second braking torque may be expressed by the following Equation 2.

Second braking torque=$B_r \times R = W \times \sin\theta$  Equation 2 wherein, $B_r$ denotes a static braking force acting on the front wheel and the rear wheel to park the vehicle, W denotes a total weight of the vehicle, and $\theta$ denotes the inclination angle of the road.

In the exemplary embodiment of the present disclosure, each factor forming the second braking torque may be set to have a maximum magnitude for safety considerations. The minimum parking lever operating force required to maintain the parking of the vehicle is a value obtained under the condition that the first braking torque is equal to the second braking torque. This value may be referred to as a reference parking lever operating force. Therefore, the reference parking lever operating force obtained according to this relationship may be expressed by Equation 3 below.

$$E = \frac{B_r \times R}{R_1 \times \varepsilon \times PBF \times R_e} + \frac{e}{R_1}$$  Equation 3

Since the second braking torque needs to be set large for safety considerations, a safety factor may be further considered. For example, if the safety factor is equal to 1.2, the magnitude of the second braking torque is further multiplied by the safety factor of 1.2. Then, the reference parking lever operating force is increased.

Meanwhile, the reference parking lever operating force calculated through the above-mentioned process is a theoretical value. To guarantee the reliability of the theoretical value in the control system according to the exemplary embodiment of the present disclosure, after the vehicle is manufactured, a manufactured test vehicle may be subjected to an actual vehicle evaluation test to obtain a measured value for each road inclination. In other words, the reference parking lever operating force may be sensed based on each inclination by the inclination sensor 22 and the parking lever stroke sensor 24 in the actual vehicle evaluation test, thus obtaining a measured value. In particular, among the theoretical value and the measured value according to each inclination, a larger value may be set as the reference parking lever operating force.

Further, in the exemplary embodiment of the present disclosure, the reference parking lever operating force is a value when the first braking torque is equal to the second braking torque. However, in another exemplary embodiment of the present disclosure, the reference parking lever operating force may be a value calculated under the condition that the magnitude of the first braking torque is greater than that of the second braking torque.

Figure 3:
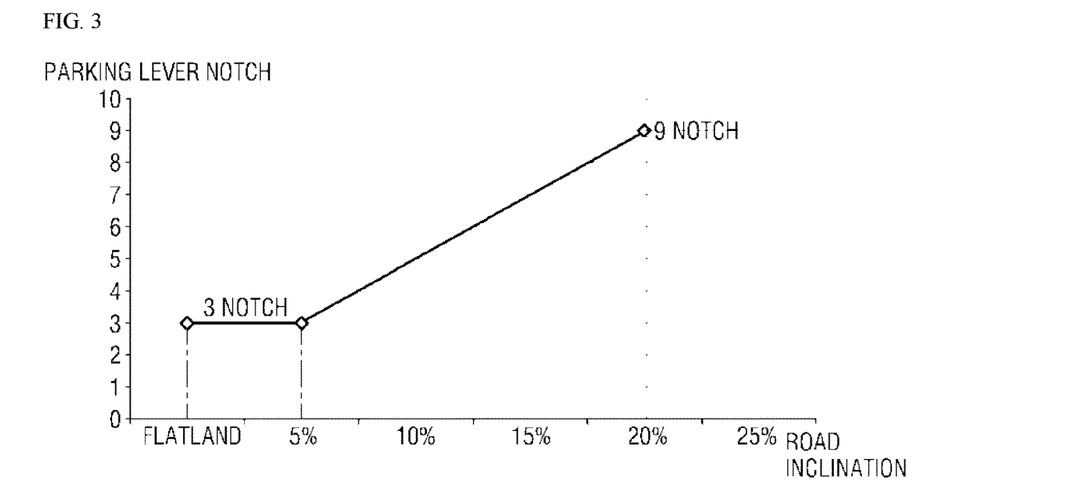
FIG. 3 is a diagram showing a reference parking lever operating force (or parking lever notch) before correction as the function of a road inclination according to the embodiment of the present disclosure.
Figure 4:
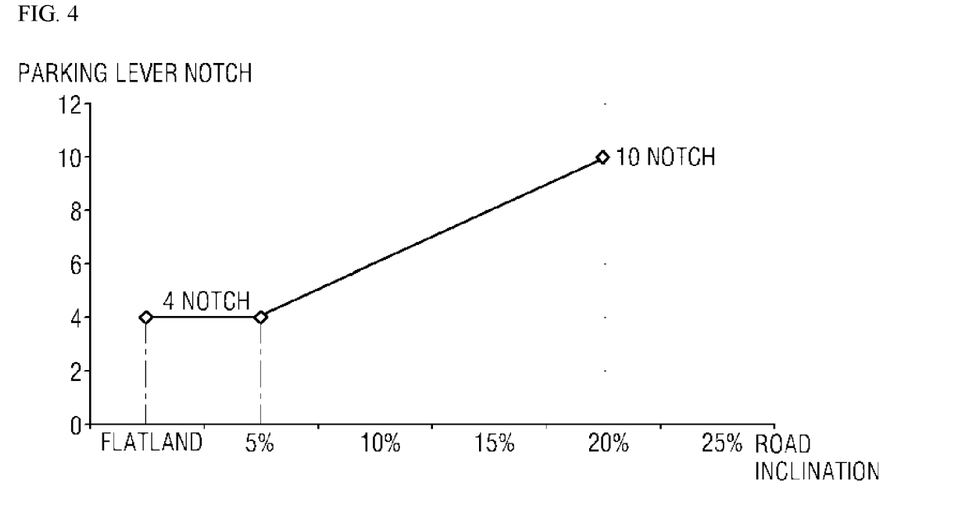
FIG. 4 is a diagram showing a reference parking lever operating force (or parking lever notch) after correction as the function of a road inclination according to the exemplary embodiment of the present disclosure.

FIG. 3 is a diagram showing a reference parking lever operating force (or parking lever notch) before correction as the function of a road inclination according to the exemplary embodiment of the present disclosure. FIG. 4 is a diagram showing a reference parking lever operating force (or parking lever notch) after correction as the function of a road inclination according to the exemplary embodiment of the present disclosure.

Referring to FIG. 3, the reference parking lever operating force calculated by changing the inclination is written as a data map matched with each inclination, and then stored in the memory 30. In particular, the reference parking lever operating force may be converted into the reference parking lever notch. As shown in FIG. 3, the parking lever notch is constant in the range of the road inclination from a flatland (0%) to a lower limit inclination for safety consideration since the vehicle may roll backwards unless the inclination sensor value is accurate within the above range. In the exemplary embodiment of the present disclosure, the lower limit inclination may be set as about 5%, but the lower limit inclination may be variously set based on the specification of components forming the parking system of the vehicle.

As described above, if the operating times of the parking lever 11 increase, the parking cable 12 may stretch or affect the components forming the parking system, and thus, the durability of the parking system may be deteriorated, and the desired parking braking force may not be generated. Thus, according to the exemplary embodiment of the present disclosure, degradation correction may be performed to increase the parking braking force that is reduced due to the durability degradation of the parking system based on the driving distance of the vehicle and the operating times of the parking lever 11.

The degradation correction is correction for increasing the parking lever operating force that is less than that of a new product, since the components forming the parking system are deformed due to increases in the driving distance of the vehicle and the operating times of the parking lever. In the exemplary embodiment of the present disclosure, for the degradation correction, a durability evaluation test may be performed to obtain the parking lever operating force (or parking lever notch) under the conditions of the driving distance of the vehicle and the operating times of the parking lever for each road inclination, after the vehicle is manufactured.

Referring to FIGS. 3 and 4, the data map generated before the correction may be modified through the degradation correction process. For example, when the road inclination is about 5% as shown in FIG. 3, the parking lever notch may be 3 notches. Meanwhile, as shown in FIG. 4, when the notch of the sensed parking lever is 4 notches when the road inclination is 5%, the driving distance of the vehicle may be about 10,000 Km, and the operating times of the parking lever are 1,000, the degradation correction is performed by 1 notch. In the exemplary embodiment of the present disclosure, the degradation correction of 1 notch may be performed in all sections based on the road inclination, but the degradation correction may be modified to another value based on each road inclination. Furthermore, for the degradation correction, various data maps with the driving distance of the vehicle and the operating times of the parking lever changed may be set. The data map on which the degradation correction is performed may be stored in the memory 30.

In the degradation correction process, reference operating times for increasing one unit (1 notch) of the parking lever notch may be calculated. Particularly, the safety factor may be considered in addition to the reference operating times. For example, if the reference operating times are 1,000 and the safety factor is 2, the reference operating times considering the safety factor are 500.

Moreover, in another exemplary embodiment of the present disclosure, the degradation correction may be performed based on the operation holding time of the parking lever and the increased length of the parking cable. For example, in the durability evaluation test, if the length of the parking cable increases by about 4 mm when the driving distance of the vehicle is 30,000 Km, the operating times of the parking lever are 25,000, and the notch of the parking lever is maintained as 10 notches for 170 hours, 4 mm is converted into the notch of the parking lever. If this corresponds to about 2 notches, the degradation correction is performed by 2 notches. In particular, if the safety factor is 2, the reference operating times are 12,500 times/2, namely, 6,250 times.

The engine controller 40 may be connected to the memory 30, and thus, in response to receiving a remote-starting request, the engine controller 40 may be configured to determine whether the remote starting is possible and then an output signal is generated to control the ON/OFF of the engine of the parked vehicle. The engine controller may include a remote starting determination unit 42 and a command unit 44.

The remote starting determination unit 42 may be configured to compare the reference parking lever operating force (or the parking lever notch) stored in the memory 30 with the parking lever operating force (or the parking lever notch) sensed by the sensor unit 20. Particularly, the parking lever operating force sensed at the inclination of the road on which the vehicle is currently parked may be compared with the reference parking lever operating force of the corresponding inclination in the data map stored in the memory 30. The remote starting determination unit 42 may then be configured to determine a notch shortage that indicates a difference between the sensed parking lever notch and the reference parking lever notch in response to determining that the sensed parking lever operating force (or parking lever notch) is less than the reference parking lever operating force (or reference parking lever notch).

The command unit 44 may be configured to compare the sensed parking lever operating force with the reference parking lever operating force to output a signal that indicates whether the setting or entry of the remote starting is possible. In response to determining that the sensed parking lever operating force is greater than the reference parking lever operating force, the command unit 44 may be configured to output a signal that indicates that the setting or entry of the remote starting is possible. In contrast, in response to determining that the sensed parking lever operating force is less than the reference parking lever operating force, the command unit 44 may be configured to output a signal that indicates that the setting or entry of the remote starting is impossible. Furthermore, the command unit 44 may be configured to output a signal regarding the notch shortage determined by the remote starting determination unit 42. A situation in which the setting or entry of the remote starting is possible will be described later.

Meanwhile, in the exemplary embodiment of the present disclosure, when the parking lever operating force is equal to the reference parking lever operating force, this corresponds to a situation where the remote starting is possible. However, in another exemplary embodiment of the present disclosure, this may correspond to a situation where the remote starting is impossible.

The display 50 may operate as an alarm configured to receive a signal from the command unit 44 and output a notification indicating whether the setting or entry of the remote starting is possible. The display may include a cluster 52 or an external terminal 54 such as a display or a smart phone in the vehicle, and may be configured to transmit the signal from the command unit 44 to a driver via various visual or audio means.

Figure 5:
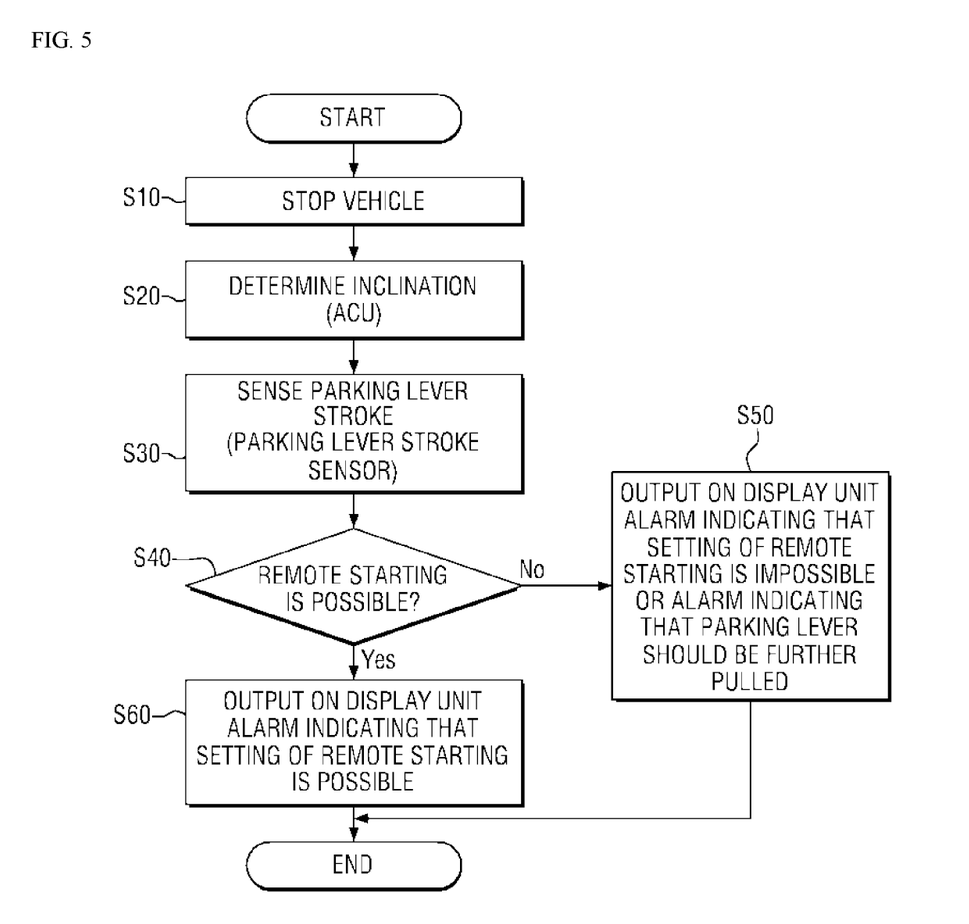
FIG. 5 is a flowchart showing a control method according to an exemplary embodiment of the present disclosure, when a vehicle is parked.
Figure 6:
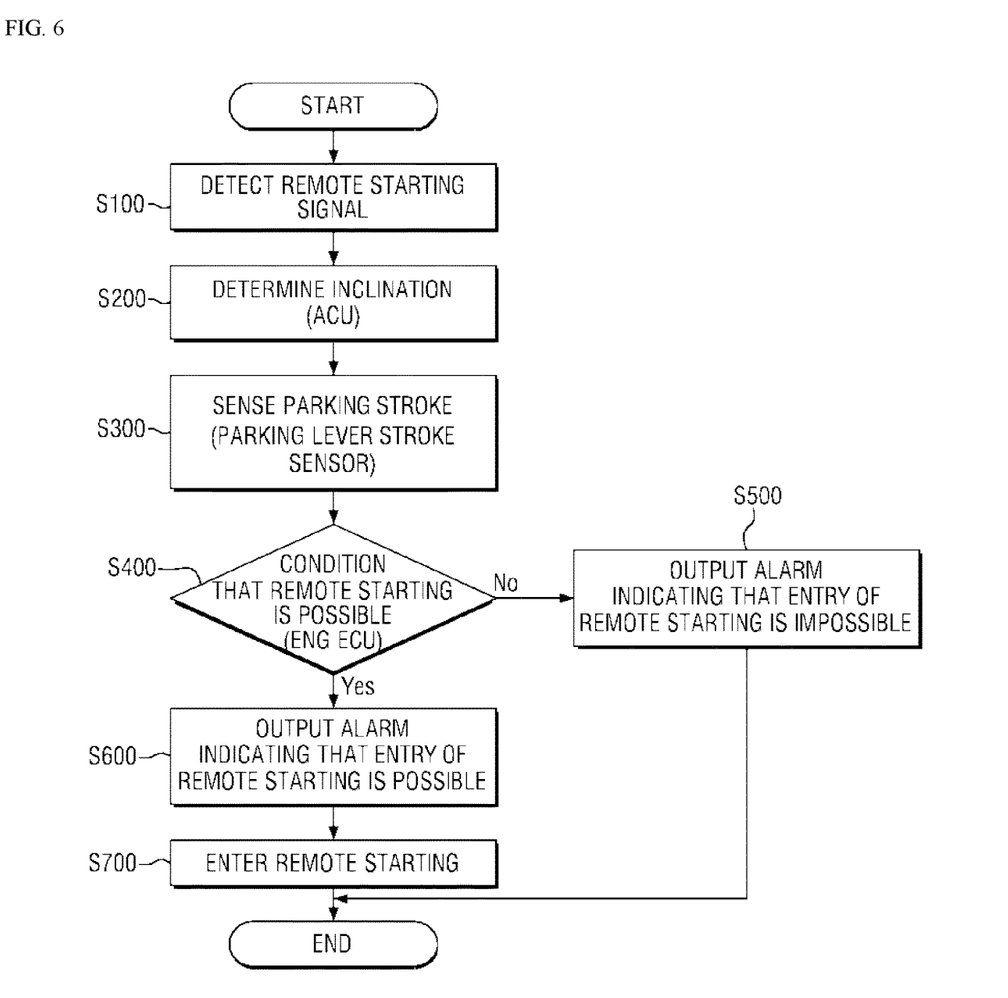
FIG. 6 is a flowchart showing the control method according to the exemplary embodiment of the present disclosure, when remote starting is performed.

FIG. 5 is a flowchart showing a control method according to an exemplary embodiment of the present disclosure, when the vehicle is parked. Notably, the method may be executed by a controller. FIG. 6 is a flowchart showing the control method according to the exemplary embodiment of the present disclosure, when the remote starting is performed.

According to the exemplary embodiment of the present disclosure, a situation in response to determining whether the remote starting is possible when a driver turns off the engine and then parks the vehicle, and a controller may be configured to determine whether the remote starting is possible when the driver attempts to enter the remote starting after the vehicle is parked. FIG. 5 shows the first situation described above, and FIG. 6 shows the second situation. The type of display 50 and an output message may be set differently in the above two situations. In other words, the display 50 of FIG. 5 may be the cluster 52 or the display in the vehicle, and the display 50 of FIG. 6 may be the external terminal 54 such as a smart phone possessed by the driver.

Referring to FIG. 5, when the vehicle stops for parking at step S10, the inclination sensor 22 may be configured to detect the inclination of the road at step S20, the parking lever stroke sensor 24 may be configured to detect the parking lever operating times and the parking lever operating force at step S30, and the counter 26 may be configured to detect the driving distance of the vehicle.

The remote starting determination unit 42 may be configured to sense the driving distance of a current vehicle, the parking lever operating times, the road inclination, and the parking lever operating force (or parking lever notch), retrieve the data map compared with the current sensing value from the memory 30, and compare the sensed parking lever operating force with the reference parking lever operating force at step S40. In response to determining that the sensed parking lever operating force (or parking lever notch) is less than the reference parking lever operating force (or reference parking lever notch), the cluster 52 may be configured to output a message that indicates that the setting of a remote starting condition is impossible or a message regarding the notch shortage under the setting condition of the remote starting at step S50.

In particular, the message regarding the notch shortage is a message that indicates that the driver should further pull the parking lever. In contrast, in response to determining that the sensed parking lever operating force (or parking lever notch) is greater than the reference parking lever operating force (or reference parking lever notch), the cluster 52 may be configured to output a message that indicates that the setting of the remote starting is possible at step S60. This indicates that the driver may attempt the remote starting later.

Referring to FIG. 6, if the remote starting signal is detected from the vehicle by manipulating the smart phone when the vehicle is parked at step S100, the inclination sensor 22 may be configured to detect the road inclination at step S200, the parking lever stroke sensor 24 may be configured to detect the parking lever operating times and the parking lever operating force at step S300, and the counter 26 may be configured to detect the driving distance of the vehicle.

The remote starting determination unit 42 may be configured to detect the driving distance of the current vehicle, the parking lever operating times, the road inclination, and the parking lever operating force (or parking lever notch), retrieve the data map compared with the current sensing value from the memory 30, and compare the sensed parking lever operating force with the reference parking lever operating force at step S40. In response to determining that the sensed parking lever operating force (or parking lever notch) is less than the reference parking lever operating force (or reference parking lever notch), the external terminal 54 may be configured to output a message that indicates that the entry of the remote starting is impossible at step S500. In contrast, in response to determining that the sensed parking lever operating force (or parking lever notch) is greater than the reference parking lever operating force (or reference parking lever notch), the external terminal 54 may be configured to output a message that indicates that the entry of the remote starting is possible at step S600. Further, the remote starting may be performed by turning on the engine at step S700.

Although the present disclosure was described with reference to specific exemplary embodiments shown in the drawings, it is apparent to those skilled in the art that the present disclosure may be changed and modified in various ways without departing from the scope of the present disclosure.

What is claimed is:

1. A method for controlling remote starting of a vehicle, comprising:
   sensing, by a controller, a driving distance of the vehicle, operating times of a parking lever, a road inclination, and a parking lever operating force, when the vehicle is parked; and
   determining, by the controller, whether the remote starting is possible by comparing a magnitude of the parking lever operating force with a magnitude of a reference parking lever operating force under conditions of the driving distance of the vehicle, the operating times of the parking lever, and the road inclination,
   wherein the reference parking lever operating force causes degradation correction to be performed, the degradation correction being correction for increasing the parking lever operating force that is reduced due to durability degradation of a parking system to a value preset for each road inclination.

2. The method of claim 1, wherein the reference parking lever operating force is a theoretical value of the parking lever operating force calculated to maintain a stop state when the vehicle is parked, or a measured value obtained by sensing the parking lever operating force after a test vehicle that is a same type as the vehicle is manufactured.

3. The method of claim 2, wherein the theoretical value is a parking lever operating force calculated under a condition that a magnitude of a first braking torque generated on a brake by an operation of the parking lever when the vehicle is parked is equal to or greater than a magnitude of a second braking torque required to park the vehicle.

4. The method of claim 2, wherein the degradation correction is performed after the reference parking lever operating force is set to a greater value among the theoretical value and the measured value by comparing the values with each other.

5. The method of claim 1, wherein the reference parking lever operating force is set to the same value at an inclination that is equal to or less than a preset lower limit inclination.

6. The method of claim 1, wherein a parking lever notch is individually set based on a range of the parking lever operating force, and reference operating times are calculated to increase the parking lever notch by one unit in a process of the degradation correction.

7. The method of claim 6, wherein the reference operating times are calculated based on a safety factor.

8. The method of claim 1, wherein the degradation correction is performed based on an operation holding time of the parking lever and an increased length of a parking cable.

9. The method of claim 1, further comprising:
   displaying, by the controller, whether setting of the remote starting is possible when the vehicle is parked or whether entry of the remote starting is possible after the vehicle is parked.

10. The method of claim 9, wherein, in response to determining that a magnitude of the parking lever operating force is greater than that of the reference parking lever operating force when the vehicle is parked, outputting an alarm indicating that the setting of the remote starting is possible, and in response to determining that the magnitude of the parking lever operating force is less than that of the reference parking lever operating force, outputting an alarm indicating that the setting of the remote starting is impossible.

11. The method of claim 10, wherein, in response to determining that the magnitude of the parking lever operating force is less than that of the reference parking lever operating force when the vehicle is parked, outputting an alarm indicating that the parking lever should be further pulled under a setting condition of the remote starting.

12. The method of claim 10, wherein the alarm is output on a display within the vehicle.

13. The method of claim 11, wherein the alarm is output on a display within the vehicle.

14. The method of claim 9, wherein, in response to determining that the magnitude of the parking lever operating force is greater than that of the reference parking lever operating force when the entry of the remote starting is attempted after the vehicle is parked, outputting an alarm indicating that the entry of the remote starting is possible, and outputting an engine ON control signal.

15. The method of claim 9, wherein, in response to determining that the magnitude of the parking lever operating force is less than that of the reference parking lever operating force when the entry of the remote starting is attempted after the vehicle is parked, outputting an alarm indicating that the entry of the remote starting is impossible.

16. The method of claim 14, wherein the alarm is output on an external terminal.

17. The method of claim 15, wherein the alarm is output on an external terminal.

18. A system for controlling remote starting of a vehicle, comprising:
   a sensor unit configured to sense a driving distance of the vehicle, operating times of a parking lever, a road inclination, and a parking lever operating force, when the vehicle is parked; and
   an engine controller configured to determine whether the remote starting is possible by comparing a magnitude of the parking lever operating force with a magnitude of a reference parking lever operating force under conditions of the driving distance of the vehicle, the operating times of the parking lever, and the road inclination, and to command setting of the remote starting when the vehicle is parked or entry of the remote starting when the entry of the remote starting is attempted after the vehicle is parked, wherein the reference parking lever operating force causes degradation correction to be performed, the degradation correction being correction for increasing the parking lever operating force that is reduced due to durability degradation of a parking system to a value preset for each road inclination.

19. The system of claim 18, wherein the reference parking lever operating force is set to the same value at an inclination that is equal to or less than a preset lower limit inclination.

20. The system of claim 18, wherein a parking lever notch is individually set based on a range of the parking lever operating force, and reference operating times are calculated to increase the parking lever notch by one unit in a process of the degradation correction.

* * * * *